United States Patent [19]
Bickel

[11] 3,895,856
[45] July 22, 1975

[54] REFLECTIVE APPARATUS
[76] Inventor: Quentin D. Bickel, 204 S. Papaga Cir., Tempe, Ariz. 85281
[22] Filed: Aug. 15, 1974
[21] Appl. No.: 497,570

[52] U.S. Cl. ............... 350/104; 350/100; 350/202; 40/130 B
[51] Int. Cl.² .......................................... G02B 5/00
[58] Field of Search .......... 40/130 B, 130 C, 130 K; 350/97, 100, 104, 202; 354/219; 356/247

[56] References Cited
UNITED STATES PATENTS
2,420,503  5/1947  Stechbart .......................... 356/247
2,831,453  4/1958  Hardesty ........................... 40/130 K
3,605,309  9/1971  Beaty et al. ....................... 40/130 B Primary Examiner—Ronald L. Wibert
Assistant Examiner—Richard A. Rosenberger
Attorney, Agent, or Firm—H. Gordon Shields

[57] ABSTRACT

Apparatus is disclosed which gathers light and reflectss the light in controlled or desired directions.

19 Claims, 12 Drawing Figures

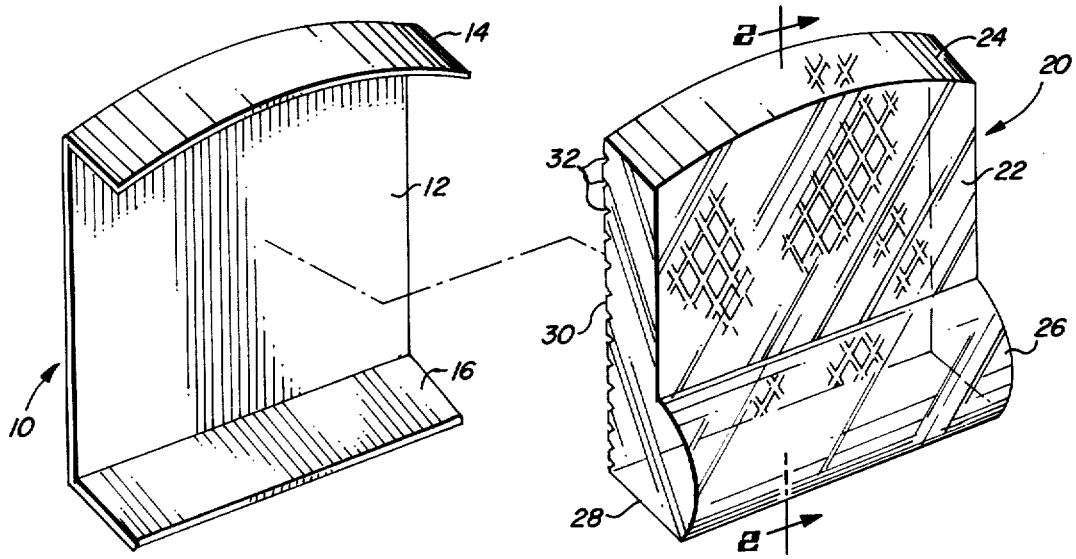
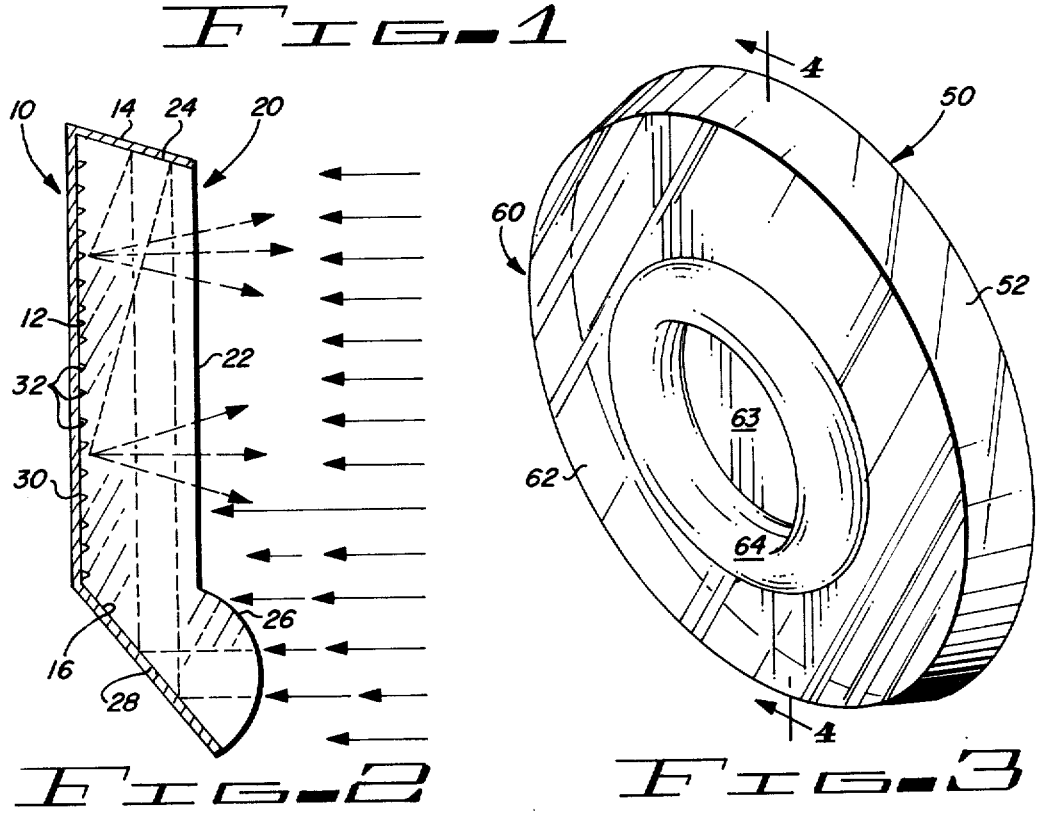
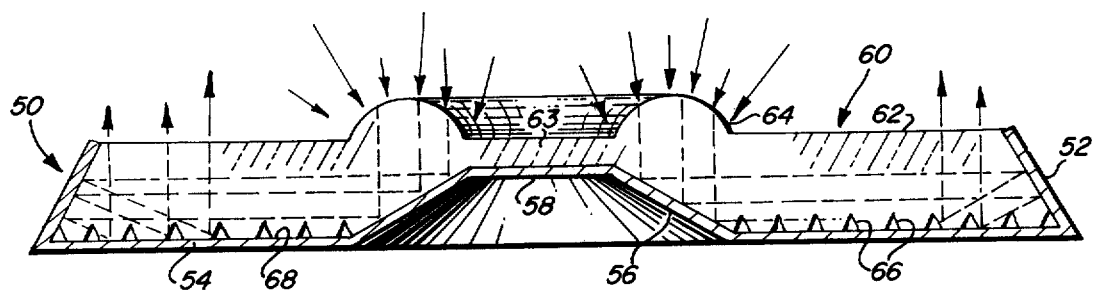
FIG-1
FIG-2
FIG-3
FIG-4

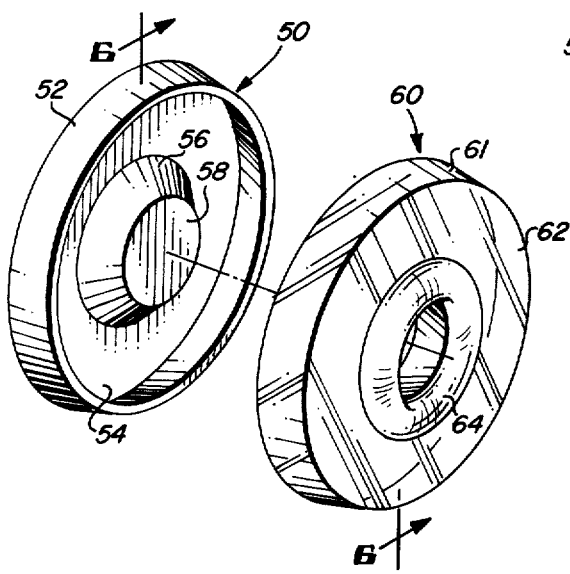
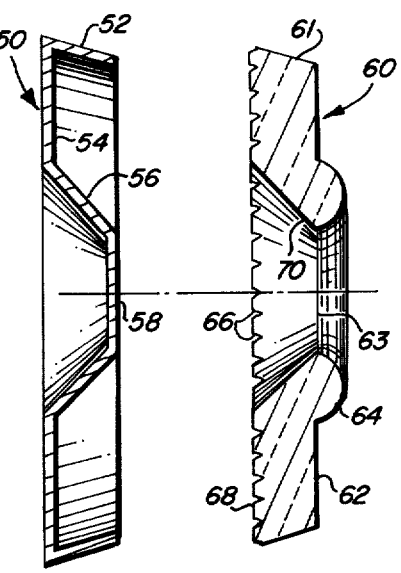
F I G – 5    F I G – 6
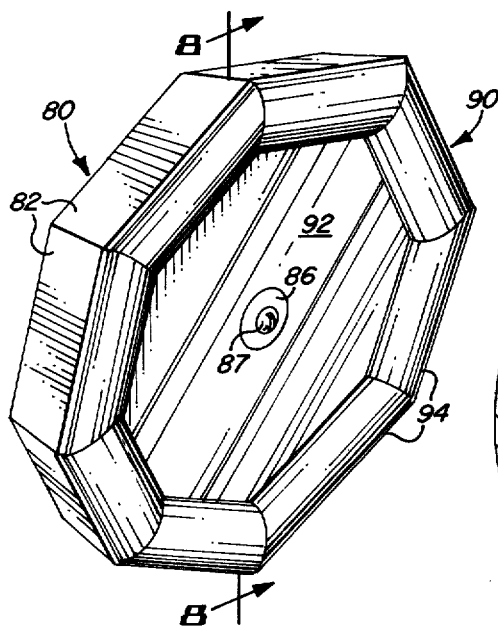
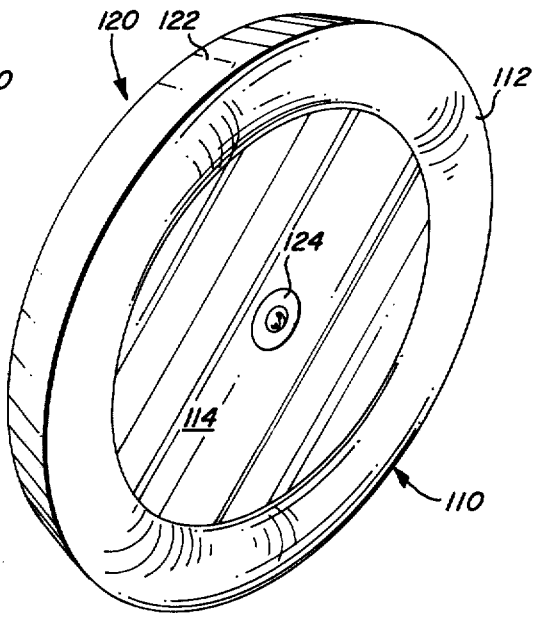
F I G – 7    F I G – 9
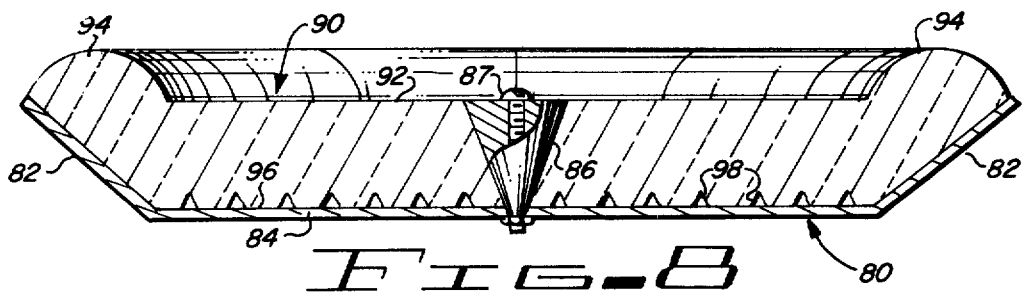
F I G – 8

REFLECTIVE APPARATUS

BACKGROUND OF THE INVENTION

1. Field of the Invention

This invention relates to reflectors, and, more particularly, the invention relates to reflective apparatus which includes lens for gathering and reflecting the light in controlled directions.

2. Description of the Prior Art

Reflective devices of all types are used in homes, in businesses, in automotive and other vehicles, on streets, on signs, and in virtually every walk of life. There are many purposes for reflective apparatus, such as mirrors in everyday use, mirrors and lens apparatus such as in reflecting telescopes, safety reflectors and lens for automobiles, bicycles, road signs, street markers, reflective stripes on clothing, and many more. The primary object of a reflective coating is to gather light and to reflect light in a particular or desired direction so as to give notice of the location of the reflector and call attention to the reflector and to the message or location of the reflector. That is, there is always a purpose for the reflector, whether it be to warn or advise persons of its location, or to draw attention to a particular message or warning thereon, or to gather light and reflect the light for study and analysis.

There are certain laws of physics which are associated with the reflection of light. There are also certain physical laws with respect to the gathering of light, reflective angles of lenses with respect to light, and diffraction and refraction laws and principles with respect to the particular type of material out of which the lenses are made. It is beyond the scope of this specification to discuss in detail any of these physical laws. As required, certain of the laws or principles will be discussed as required for the understanding of the present invention.

As traffic problems increase due to increased traffic on highways and streets, there is increased need for improvement in efficiency of the light gathering and reflecting qualities or abilities of reflectors used by vehicles of all types, including automobiles and bicycles. One need of paramount importance is the need to give notice of the presence of bicycles, which are typically much slower in motion than automotive vehicles, and much more difficult to see due to their size and their lack of electrical power to provide adequate lights. As indicated above, there are numerous other uses for improved reflectors with increased efficiency in gathering light and in reflecting the gathered light in controlled or desired directions with respect to the reflective apparatus.

SUMMARY OF THE INVENTION

Invention described and claimed herein comprises reflective apparatus including polished surfaces used in conjunction with lenses to gather and to reflect light in desired directions, and to minimize the undesirable scattering of the light in directions other than those as desired.

Among the objects of the present invention are the following:

to provide new and useful reflective apparatus;

to provide new and useful reflective apparatus for gathering light;

to provide new and useful apparatus for reflecting light in desired directions;

to provide new and useful lens designs for the gathering of light;

to provide new and useful apparatus for minimizing the scattering of light;

to provide new and useful lens apparatus for reflecting light; and to provide new and useful reflective lens apparatus.

BRIEF DESCRIPTION OF THE DRAWING

FIG. 1 is an exploded isometric view of light gathering and reflective apparatus embodying the present invention.

FIG. 2 is a view in partial section taken along line 2—2 of FIG. 1.

FIG. 3 is an isometric view of an alternate embodiment of light gathering and reflective apparatus embodying the present invention.

FIG. 4 is a view in partial section taken along line 4—4 of FIG. 3.

FIG. 5 is an exploded isometric view of the apparatus of FIG. 4.

FIG. 6 is a view in partial section of the apparatus of FIG. 5 taken generally along line 6—6.

FIG. 7 is an isometric view of an alternate embodiment of reflector apparatus embodying the present invention.

FIG. 8 is a view in partial section of the apparatus of FIG. 7 taken along line 8—8 of FIG. 7.

FIG. 9 is an isometric view of an alternate embodiment of the apparatus of FIGS. 7 and 8.

DESCRIPTION OF THE PREFERRED EMBODIMENT

Figure 10:
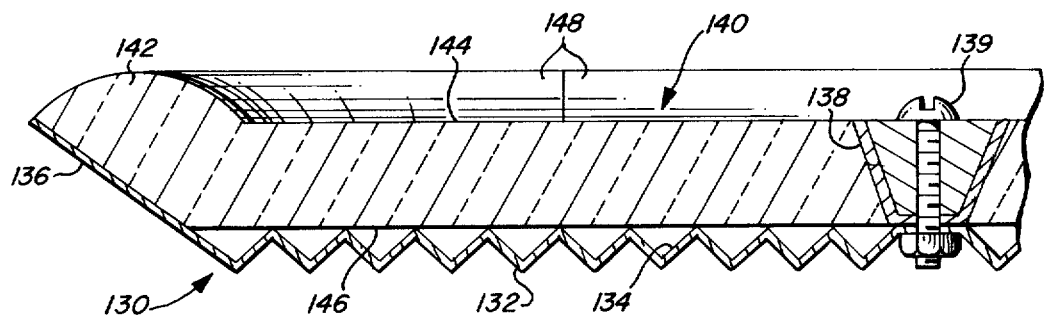
FIG. 10 is a broken view in partial sections of an alternate embodiment of the present invention.

FIG. 1 is an exploded isometric view of light gathering and reflective apparatus embodying the present invention. The apparatus includes two primary parts, a reflector 10 and a lens 20. In FIG. 1 the lens and the reflector are separated; that is, the lens 20 is shown removed from the reflector 10 outwardly thereof.

The reflector 10 includes a back 12, a top 14, and a bottom 16. The back 12 is generally planar in configuration, and is highly polished so as to maximize its reflective capabilities. Typically it would be fabricated from steel, or some other metal which is capable of being polished or coated so as to be highly reflective. The top 14 is curved and is extending downwardly towards the bottom 16. Thus the top 14 is compound in its curvature including both a downward curve and a circular type curve with respect to the back 12. The bottom 16 is planar in configuration and is bent downwardly at an angle with respect to the back 12. The angle between the top 14 and the back 12 is less than the angle between the back 12 and the bottom 16. Accordingly, the top 14, disregarding its curvature, is bent downwardly towards the back 12 and towards the bottom 16 at an angle less than the bottom 16 so that the two, again disregarding the curvature of the top 14, are not parallel. The reason for this will be discussed later in conjunction with FIG. 2.

The underneath portion of the top 14, or that which is disposed against lens 20, is polished to a high degree of reflectivity substantially the same as the back 12. Similarly, the upper portion of the bottom 16, or that which is adjacent the lens 20, is also polished to a high degree of reflectivity. Obviously, the reflector 10, including the back 12, the top 14, and the bottom 16, may be fabricated from the same material, and all respective portions which are disposed adjacent the lens are polished for maximum reflectivity.

The lens 20 includes a front face 22, a top portion 24, and a convex portion 26 which is disposed on the lower portion of the lens and extends outwardly from the front 22 of the lens. The lens also includes a bottom face 28 which extends from the convex portion 26 to, and terminates at, a back 30. The back 30 is substantially parallel to the front face 22 and extends from the top 24 to the bottom 28. The back 30 is appropriately cut so as to contain a plurality of facets 32. The facets are used to reflect the light outwardly from the lens. The convex portion 26 is used to gather light into the lens for reflection by the reflector 10, which in turn is used to reflect the light to the facets for ultimate reflection of the light outwardly from the lens.

The lens may be made of any appropriate material, restricted only by the transparency thereof. Obviously, glass or some type of transparent plastic may be used. It should be noted that the term "transparent" is not to be confused with the term "clear". That is, the lens 20 may be made of colored material that will reflect colored light outwardly therefrom, such as red or amber, as is typically used with automobiles. Other colors, such as white, yellow, blue, or other desired color may be used.

The curvature of the top face 24 of lens 20 is shown in FIG. 1, as is also the curvature of the top 14 of the reflector 10. The facets 32 on the back 30 of the lens are illustrated in FIGS. 1 and 2, both on the left-hand portion of the lens 20, and also in the diamond shaped lines which are illustratively shown through the front face 22 and through the convex portion 26 of the lens as being disposed on the back 30 of the lens.

FIG. 2 is a view in partial section of the apparatus of FIG. 1 taken generally along line 2—2 of FIG. 1. In FIG. 2, the reflector 10 and the lens 20 are shown in their assembled state, rather than in the exploded or separated state shown in FIG. 1.

The assembled reflective apparatus illustrated in FIG. 2 also includes illustrative rays of light, shown as arrows, going into and out from the reflective apparatus. The light rays going into the reflective apparatus through the front 22 of the lens 20 go through the lens and are reflected directly back out from the lens either by reflecting directly off the back 12 of the reflector and outwardly through the lens, or by being reflected from one of the facets 32 cut into the back 30 of the lens. The provision of the facets on the back 30 of the lens, adjacent the back 12 of the reflector 10, results in a bending or change of the light beams as they impinge upon the facets. The result is of course a scattering of the light outwardly from the lens, but in a different direction than if the light rays had impinged directly upon the reflector back 12 rather than on one of the facets 32.

With respect to the light impinging upon the convex light gathering portion 26 of the lens 20, the light will be directed toward the bottom 28 of the lens and against the bottom portion 16 of the reflector. From the bottom 16 of the reflector, the light will be directed through the lens towards the top 14 of the reflector 10, and from the top 14 the light will be reflected downwardly and backwardly towards the facets 32 and the back 30. Again, the light striking the facets will be diverted toward the reflector back 12 and thence outwardly from the lens. The angle at which the light strikes the bottom portion 16 of the reflector 10 is correlated with respect to the convex portion 26 of the lens such that the light is reflected toward the top 14. The top 14 is disposed with respect to the back 12 at such an angle that the light impinging upon the top 14 is reflected towards the facets 32 and towards the back 30 of the lens. Accordingly, the light gathered through the convex portion 26 of the lens is directed sequentially toward the bottom 16, the top 14, and then to the facets 32 or to the back 30 of the lens. The light striking the facets or the back is reflected outwardly through the front 22 of the lens, which is the planar portion of the lens as opposed to the top 24 or to the convex portion 26.

An alternate embodiment of reflector apparatus is shown in FIG. 3, in which the reflector apparatus is circular in overall configuration, and with a circular convex lens portion disposed in the center of the lens. The lens apparatus shown in FIG. 3 is an isometric rendering of the reflector apparatus including a reflector 50 and a lens 60. The reflector 50 again covers the back portion of the lens and the outer edge of the lens. The edge of the lens is covered by a rim 52 of the reflector.

The reflective apparatus includes a lens portion 60 disposed within the reflector 50 and held in place by the rim portion 52 of the reflector. The lens 60 includes a planar portion 62 and a convex lens portion 64 of substantially smaller diameter than the planar portion of the lens. The planar portion extends outwardly from the convex light gathering lens portion 64 to the rim 52 of the reflector. The convex portion extends upwardly from the planar portion of the lens, and is concentric with respect to the rim 52, but of substantially smaller diameter. The convex portion comprises the light gathering portion of the lens. Located concentrically within the convex lens 64 is a central planar portion 63.

FIG. 4 is a view in partial section of the reflective apparatus of FIG. 3 taken generally along line 4—4 of FIG. 3. The workings of the reflective apparatus are again illustrated by a plurality of arrows representing rays of light impinging upon the lens apparatus and exiting from the lens apparatus.

The reflector 50 includes a back portion 54 and a rim portion 52 secured to the back portion 54 and extending at an acute angle with respect thereto and circumferentially about the corresponding edge of the lens 60. The back also includes an inner conical reflective portion 56 extending upwardly from the back 54. It matingly engages the lens 60 substantially beneath the convex portion 64 of the lens. That is, the walls of the inner reflective portion 56 are disposed beneath the convex portion 64 of the lens so as to reflect the light gathered and focused by the convex portion 64 of the lens so as to reflect the light gathered and focused by the convex portion 64 towards the inside portion of the rim 52. A plurality of facets 66 are located on the back of the lens 60 and they serve to reflect the light.

The rim 52, as stated previously, is at a generally acute angle with respect to the back 54. The conical sloping wall of the inner reflective portion 56 is disposed at an obtuse angle with respect to the back 54 between the rim and the inner reflective portion. Accordingly, the light gathered by the convex portion is focused against the conical inner reflective portion 56 and in turn is reflected towards the rim 52. The light reflected from the rim 52 is directed towards the back 54 and towards the facets 66. The facets are spaced apart from each other and are cut in a pattern for maximum reflectivity and maximum effectiveness for the scattering of rays of light.

The lens 60, in addition to the front planar face portion 62, includes also a back 68 into which are cut the facets 66. The back 68 is disposed adjacent the back 54 of the reflector 50. The reflector also includes a raised center portion 58 within the inner reflective portion 56. The center portion 56 serves to reflect any light impinging upon the center portion 63 of the lens within convex portion 64.

FIG. 5 is an exploded view of the apparatus of FIGS. 3 and 4, showing the lens 60 separated from the housing 50. The housing 50 is shown with its rim 52 extending outwardly from the back 54 at an acute angle thereto. The rim also extends circumferentially about the back 54. Concentrically with the rim 52 is the conical inner reflective portion 56 with its center portion 58. The configuration of the center portion 56 is substantially that of a truncated cone. The angle between the back 54 and the inner reflective portion 56 is such that light impinging on the inner reflective portion, either directly or through the convex light gathering portion 64 of the lens 60, is reflected outwardly toward the rim 52. From the rim the light is then reflected to the back 54.

The lens 60 is shown separated from the reflector 50 and it illustrates the cooperation between the reflector 50 and the lens 60. The reflector includes a front planar face portion 62 extending inwardly with respect to outer rim 61 of the lens. The outer rim 61 of the lens matingly engages the rim 52 of the reflector 50. When the lens apparatus is disposed within the reflector, the outer rim 61 is disposed adjacent, and inside, the rim 52 of the reflector.

Inwardly from the outer rim 61 of the lens 60, but concentric therewith, is a circular convex portion 64 which serves to gather light for the reflective apparatus.

FIG. 6 is a side view in partial section of the apparatus of FIG. 5, taken generally along line 6—6 thereof. It shows a side view of the reflector 50 separated from the lens 60. The apparatus is slightly rotated and in partial section with respect to FIG. 5.

In the side view of FIG. 6, the reflector 50 is shown including a rim portion 52, a back portion 54, and a conical inner portion 56, and a center portion 58. The rim 52 is formed at an acute angle with respect to the back 54. However, the inner reflective portion 56, which is in the form of a truncated cone, is at an obtuse angle with respect to the back 54. The light impinging upon the reflective inner portion 56 is reflected to the rim 52 and thence rearwardly and backwardly towards the back 54. Light impinging on the center portion 58 is reflected generally back towards the source of the light, allowing, of course, for the angular reflection thereof.

The general configuration of the lens 60 is complimentary to that of the reflector 50, since they are matingly joined together. The lens 60 includes an outer rim 61 which, when the lens and reflector are secured together, is disposed adjacent the rim 52 of the reflector.

The lens also includes a front planar portion 62 which is substantially parallel to the back 68. Facets 66 are cut into the back 68. The rim 61 extends between the front planar portion 62 and the back 68.

A convex light gathering portion 64 of the lens 60 extends upwardly from the front planar portion 62. The convex portion 64 is circular in configuration, and substantially concentrically parallel to the outer rim 6. Extending downwardly and outwardly from beneath the convex portion 64 is an inner rim 70. The inner rim 70 is disposed against the inner reflective or conical portion 56 of the reflector when the lens and reflector are assembled together. Thus as previously explained, light impinging upon the light gathering convex portion 64 is converged toward the inner rim 70 and the inner reflective portion 56 of the reflector, where it is then reflected towards the rim 52 and thence toward the back 68 and the facets 66. The cooperative effect of the back 54 of the reflector 50 and of the facets 66 and the back 68 results in the reflection of the light outwardly from the reflective apparatus in a highly effective and efficient manner.

FIG. 7 is an isometric view of an alternate embodiment of reflective apparatus, in which the convex light gathering portion of the lens is disposed on the outer periphery of the apparatus.

In the embodiment of FIG. 7, the lens is not circular, but rather it is in the form of a polygon with an even number of sides. That is, the external periphery of the lens, rather than being circular, is divided into an even number of segments of substantially equal length. The number of sides or lens segments is shown as an even number, but may also be an odd number, as discussed below.

The reflective apparatus of FIG. 7 includes an outer reflector 80 and an inner lens 90. The reflector 80 includes a plurality of outer rim segments 82 disposed on the outer periphery of the lens apparatus. The rim segments 82 are of substantially equal length. The reflector also includes an inverted cone 86 disposed centrally of the apparatus. An appropriate fastening means, such as a bolt 87, extends through the cone 86 to hold the lens and reflector together.

The lens 90 includes a flat planar portion 92 surrounded by a plurality of convex light gathering lens portions 94. The light gathering lens portions 94 are convex segments extending upwardly or outwardly from the flat planar portion 92 of the lens. Since they are adjacent the rim segments 82, there is an even number of the convex portion.

FIG. 8 is a view in partial section taken generally along line 8—8 of FIG. 7. It is a view in partial section of the lens apparatus of FIG. 7.

The reflective apparatus of FIGS. 7 and 8 includes a reflector 80 and a lens 90. The reflector 80 includes a plurality of rim segments 82 extending outwardly from a back 84. The lens 90 is generally circular in configuration, except that the external periphery is a series of segments rather than a continuous curve. The convex portions 94 extend upwardly from the planar front portion 92 about the outer periphery of the lens 90. As illustrated in FIG. 7, the convex portions are actually straight convex lens sections or segments, and they are disposed adjacent the rim segments 82 of the reflector 80. Light gathered by the convex portions 94 are focused or converged toward the rim segment 82 of the reflector and are then reflected through the lens toward the center of the lens to a reflective cone 86.

The center of the reflective apparatus comprises a conical shaped reflector 86, whose outer periphery receives the light rays reflected from the rim segments 82. The cone 86 reflects the light downwardly towards the back 84 of the reflector 80.

The cone 86 is disposed with respect to the lens 90 and to the reflector 80 such that the wide portion of the cone is adjacent the planar portion 92 and the narrow point of the cone is adjacent the back 84 of the reflector 80. Appropriate fastening apparatus, such as a bolt 87, a washer, and a nut, are used to secure the cone and the lens and reflector together. Thus the cone serves to wedge or bias the lens against the reflector, where the three portions, the cone, the lens, and the reflector, are secured together.

The lens 90, in addition to the planar portion 92 and the convex portion 94, also includes a back 96 into which are cut a plurality of facets 98. The back is disposed, in the assembled condition, adjacent the back 84 of the reflector. Thus the light reflected from the rim segments 82 towards the cone 86, and away from the cone 86, and the light impinging directly onto the lens through the planar portion 92, is reflected from the back 84 of the reflector either directly via the back 96 or the facets 98 of the lens. The light scattering and reflecting function of the facets and of the back of the reflector and of the lens has been described in detail above, and is substantially the same in this embodiment.

The light gethered through the convex segments 94 converges toward the rim segments 82 and then towards the cone 86, which is located centrally with respect to the lens and reflector. The cone 86 is disposed with respect to the apparatus such that the light impinging on the sides of the cone is reflected downwardly and backwardly towards the facets and the back of the lens and of the reflector.

Some light gathered by the convex lens segments 94 will be reflected directly towards an opposite rim segment 82 and thence outwardly of the apparatus rather than towards the cone and towards a facet. The light thus reflected outwardly from an even number of segments will be in a regular pattern provided it passes the cone. If the light is reflected from the central cone, it will of course be reflected from the facets or from the back.

If desired, the apparatus of FIGS. 7 and 8 could include an odd number of side segments. In such case the light gathered by the convex lens segments which passes the cone would be reflected back and then out at random angles and patterns rather than the more regular patterns of apparatus shaping an even number of sides.

FIG. 9 is another embodiment of reflective apparatus, similar to that of FIGS. 7 and 8, except that the outer periphery of the reflective apparatus is not segmented. Rather, the outer periphery is circular, similar to the embodiment of FIGS. 3–6, but reversed with respect to the convex light gathering lens. In the embodiment of FIG. 9, a convex lens portion 112 is disposed on the outer periphery of a lens 110 rather than inwardly. That is, the convex portion 112 of the lens 110 comprises the outer periphery of the lens and the light gathered by the convex portion is reflected inwardly towards a cone 124, such as disclosed in the embodiments of FIGS. 7 and 8. The reflective apparatus of FIG. 9 functions substantially the same as that of FIG. 7, with the exception that the convex lens is circular and continuous in configuration rather than segmented as illustrated in FIGS. 7 and 8.

The apparatus includes a generally circular reflector 120, with an outer peripheral rim 122 extending outwardly at an obtuse angle from a planar back portion (not shown), similar to the embodiment of FIGS. 7 and 8. The lens 110 includes, in addition to the convex light gathering lens portion 112, a central planar portion 114 disposed within the convex portion 112. Facets, not shown, are cut into the back portion of the lens, substantially similar to the embodiment shown in FIG. 8.

Light impinging on the planar portion 114 of the lens will be reflected by the facets and by the reflector. Light impinging on the convex light gathering portion is reflected towards either the cone or the convex lens portion, opposite, and the inside of the reflector rim. If the light hits the central cone, it is reflected towards the facets and the reflector, which in turn reflect the light outwardly. If the light misses the cone and is directed towards the opposite convex lens portion, it is reflected outwardly through the lens by the interior of the rim of the reflector.

In each of the above described embodiments, the convex lens portion gathers light and focuses the light onto reflectors and facets. In turn, the light is directed outwardly from the facets and reflectors.

If desired, the facets may be pressed into the metal of the reflector. The light is then reflected back into the lens at various angles. This is illustrated in FIG. 10.

FIG. 10 is a broken view in partial section of apparatus illustrating facets in the reflector. The reflector apparatus illustrative therein includes a reflector 130, including a back portion 132 into which are pressed or otherwise formed a plurality of facets 134. As is obvious, the facets are appropriate angular or diamond type depressions, extrusions, and the like, which serve to reflect light impinging thereon. Obviously, if the reflector has the facets therein, the reflector back will still be highly reflective, as described above. The only difference is that rather than providing a smooth, planar surface on the back of the reflector, the reflector back includes the facets.

The reflector also includes a rim portion 136 which is disposed at a generally obtuse angle with respect to the back. Disposed in the center portion of the reflective apparatus is a cone 138 which provides a conical reflective surface. The surface of the cone is generally disposed at an acute angle with respect to the adjacent reflector back 132. The cone is held to the apparatus, and it in turn holds in place or secures the reflector 130 and a lens 140, by appropriate fasteners, such as a bolt 139 and an associated washer and nut. The lens 140 illustrated in FIG. 10 is in the general configuration of a polygon, with an odd number of rim segments which comprises the sides. The reflective characteristics of such apparatus has been discussed above. The lens 140 includes a convex portion 142, which comprises the rim segments, and a planar front portion 144. Since the reflector back 132 includes facets 134, there is no need for facets to be cut into the rear or back portion of the lens, and accordingly the back of the lens is also planar in configuration, as illustrated by reference number 146. The front planar portion 144 and the back or rear planar portion 146 of the lens are substantially parallel to each other. The convex portion 142 of the lens is divided into a plurality of rim segments 148, with the plurality being odd in number, as stated above. As shown, the convex lens portion, which comprises the light gathering portion of the reflective apparatus, is disposed at the outer periphery of the apparatus.

The convex light gathering portion 142 of the lens 140 is disposed adjacent the rim 136 of the reflector 130. Light gathered by the convex portion 142 is straightened and aligned substantially parallel with each other and is directed toward the interior of the rim 136. Since the rim 136 is set or disposed at an obtuse angle, with respect to the back 132, the light is reflected from the rim 136 to the exterior surface of the cone 138. With the cone 138 disposed at an acute angle with respect to the back 132, the light in turn is reflected off the cone and directed toward the facets 134. From the facets 134, the light is reflected outwardly of the apparatus. Light which impinges directly onto the planar front portion 144 of the lens, is transmitted through the lens and in turn impinges directly on the facets 134, and is reflected outwardly through the lens. As in the other embodiments, the interior of the reflector, including the interior of the rim 136, the facets 134, and the cone 138, are all highly polished for maximum reflectivity of light.

Figure 11:
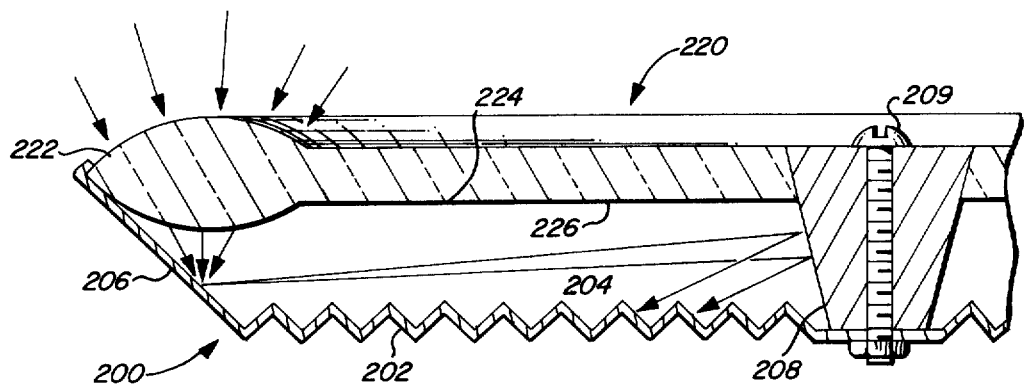
FIG. 11 is a view in partial section of still another embodiment of the present invention.

FIG. 11 is the view in partial section, and partially cut away of an alternate embodiment of the present invention. The embodiment of FIG. 11 includes a "fin lens", with a double convex rim portion at the exterior periphery of the lens. The apparatus includes a reflector 200 with a back portion 202, facets 204 pressed or otherwise formed into the back. At the outer periphery of the reflector is a rim 206 which extends at an obtuse angle with respect to the back 202. In the center of the reflector of that apparatus is a cone 208 which is substantially the same as the cones disclosed in the previous embodiments. Including with the cone is appropriate fastening apparatus, such as bolt means 209, which secures the reflective apparatus together. As in the other embodiments, the exterior periphery of the cone 208, which is disposed at an acute angle with respect to the adjacent portions of the back 202, the rim 206, and the facets 204, are highly polished for maximum reflectivity.

The reflective apparatus of FIG. 11 also includes a lens 220, which is thinner than the lenses of the previous embodiments. The lens 220 includes a double convex portion 222 disposed at the outer periphery thereof and adjacent the rim 206 of the reflector 200. The double convex portion 222 is generally circular in configuration, similar to the embodiment of FIG. 9, rather than segmented as in the embodiments of FIGS. 7, 8, and 10. The lens 220 also includes a pair of planar surfaces, a front planar portion 224 and a rear or back planar portion 226. The planar back 226 is separated by an air gap from the back 202 and the facets 204. Accordingly, the light impinging in the lens, both the double convex portion 222 and the front planar portion 224, travels through an air gap prior to impinging on the reflector. There is this refraction of the light rays in addition to the reflection discussed herein and as illustrated. However, no attempt has been made to illustrate the refraction.

The light gathered by the double convex portion 222 is focused at a point, or generally at a circle with respect to the overall lens, on the interior of the rim 206.

From the rim 206 the light is reflected to the outer surface of the cone 208, and thence downwardly toward the facets 204. Obviously, the double concave lens portion 222 is not a perfect lens and accordingly the point or band of the focused light on the interior of the rim 206 will have some width to it. However, the light will generally be focused in a smaller area than the light rays which are transmitted in substantially parallel form through the convex portion of the lens of the previous embodiments.

Figure 12:
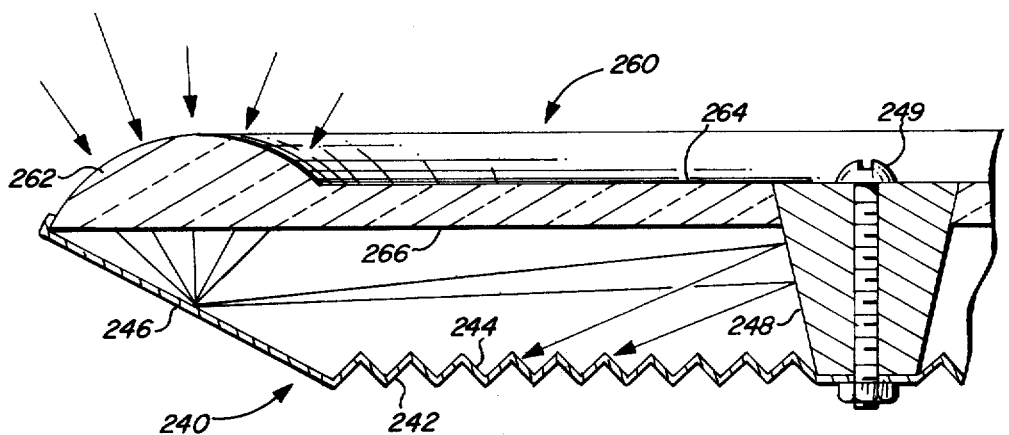
FIG. 12 is also a view in partial section of an alternate embodiment of the apparatus of FIG. 12.

FIG. 12 is a view in partial section of an alternate embodiment of the apparatus of FIG. 11, disclosing a plano-convex portion of the lense. The reflective apparatus of FIG. 12 includes a reflector 240 and a lens 260. The reflector 240 includes a back 242 with a plurality of facets 244 formed into the back, and a rim 246. A cone 248 is secured to the center portion of the reflector 240 and the lense 260. It serves to reflect light to the facets and also to hold the lens and the reflector together. Appropriate fastening means, such as bolt means 249, are used to secure the lens and the reflector together. The rim 246 is disposed at an obtuse angle with respect to the back 242, and the surface of the cone 248 is disposed at an acute angle with respect to the back. As in the previous embodiments, the interior surfaces of the facets of the back, the rim, and the cone are highly polished so as to be highly reflective, and accordingly, efficient in reflecting light.

The lens 260 includes a plano-convex portion 262 disposed at the outer periphery of the lens. The lens is generally circular in configuration with the plano-convex portion at the outer portion or periphry of the lens. The lens includes a planar front portion 264 and a planar back portion 266, both of which are substantially parallel to each other.

As with the embodiment of FIG. 11, the light gathered by the plano-convex portion 262 of the lens 260 will tend to focus light toward a point, or, with respect to the entire plano-convex peripheral portion of the lens, the light will tend to be focused toward a narrow band on the interior surface of rim 246. From the rim 246, the light is reflected toward the exterior surface of the cone 248 which in turn reflects the light downwardly toward the facets 244. From the facets 244 the light is reflected back or outwardly from the reflective apparatus. Obviously, as in the prior embodiments, when light impinges directly on the planar portion of the lens, the light is transmitted through the lens and directly to the facets and from thence outwardly of the reflective apparatus.

The embodiments of FIGS. 11 and 12 show a portion of the rim bent over to hold the lens securely against the rim. Any appropriate means may be used for the purpose of securing the outer periphery of the lens and the rim together.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and rules promulgated under the authority thereof.

What is claimed is:

1. Reflective apparatus, comprising, in combination:
   lens means, including a convex portion for gathering light and a planar portion disposed adjacent said convex portion;
   reflector means, including a back portion disposed substantially parallel to the planar portion of the lens means, a portion disposed at an obtuse angle with respect to the back portion and adjacent the convex portion of the lens means, and a portion disposed at an acute angle with respect to the back portion for reflecting light rays from the obtuse angle portion; and
   facet means for receiving and reflecting light rays from the planar portion of the lens and from the acute angle portion of the reflector means.

2. The apparatus of claim 1 in which the lens means and the reflector means are circular in configuration.

3. The apparatus of claim 2 in which the convex portion of the lens means is disposed at the center of the lens means.

4. The apparatus of claim 2 in which the convex portion of the lens means is disposed at the outer periphery of the lens means.

5. The apparatus of claim 4 in which the facet means are disposed on the lens means.

6. The apparatus of claim 4 in which the facet means are disposed on the reflector means.

7. The apparatus of claim 1 in which the lens means and the reflector means are in the configuration of a polygon.

8. The apparatus of claim 7 in which the convex portion of the lens means is disposed at the outer periphery of the lens means.

9. The apparatus of claim 8 in which the number of sides of the polygon is even.

10. The apparatus of claim 9 in which the facet means are disposed on the lens means.

11. The apparatus of claim 9 in which the facet means are disposed on the reflector means.

12. The apparatus of claim 8 in which the number of sides of the polygon is odd.

13. The apparatus of claim 12 in which the facet means are disposed on the lens means.

14. The apparatus of claim 12 in which the facet means are disposed on the reflector means.

15. The apparatus of claim 1 in which the facet means are disposed on the lens means.

16. The apparatus of claim 1 in which the facet means are disposed on the reflector means.

17. The apparatus of claim 16 in which the lens means is spaced apart from the back portion of the reflector means.

18. The apparatus of claim 17 in which the convex portion of the lens means is double convex.

19. The apparatus of claim 17 in which the convex portion of the lens means is plano-convex.

* * * * *